United States Patent [19]

Kerek

[11] Patent Number: 5,140,661
[45] Date of Patent: Aug. 18, 1992

[54] OPTICAL FIBER TERMINUS

[75] Inventor: Leslie Kerek, Los Angeles, Calif.

[73] Assignee: G & H Technology, Inc., Camarillo, Calif.

[21] Appl. No.: 741,082

[22] Filed: Aug. 6, 1991

[51] Int. Cl.⁵ .............................................. G02B 6/36
[52] U.S. Cl. ...................................... 385/81; 385/62; 385/55; 385/87
[58] Field of Search ............................ 350/96.2, 96.21; 385/55, 62, 81, 76, 86, 87

[56]  References Cited
U.S. PATENT DOCUMENTS

| | | | |
|---|---|---|---|
| 4,482,201 | 11/1984 | Dousset | 350/96.2 |
| 4,815,808 | 3/1989 | Honma et al. | 350/96.2 |
| 4,842,363 | 6/1989 | Margolin et al. | 350/96.2 X |
| 4,948,222 | 8/1990 | Corke et al. | 350/96.21 X |

Primary Examiner—John D. Lee
Assistant Examiner—Stephen W. Barns
Attorney, Agent, or Firm—George J. Netter

[57] ABSTRACT

A terminus for an optical fiber cable (10) has a ferrule (22) with an endwall portion (24) including an axial opening (26) for receiving a glass fiber core. A ferrule central portion (28) is larger in cross-section than endwall portion (24) and the opposite end portion (32) is still larger. In assembly, the fiber jacket (16) or strain relief is peeled back over an underlying sleeve (34) and crimped within the opposite end portion (32). The central ferrule portion (28) has an internal sleeve (40) fitted over a section of the optical fiber with buffer tubing (14) and the ferrule is crimped in place. The fiber outer end portion consists of just the bare glass core (12) received within endwall opening (26).

6 Claims, 2 Drawing Sheets

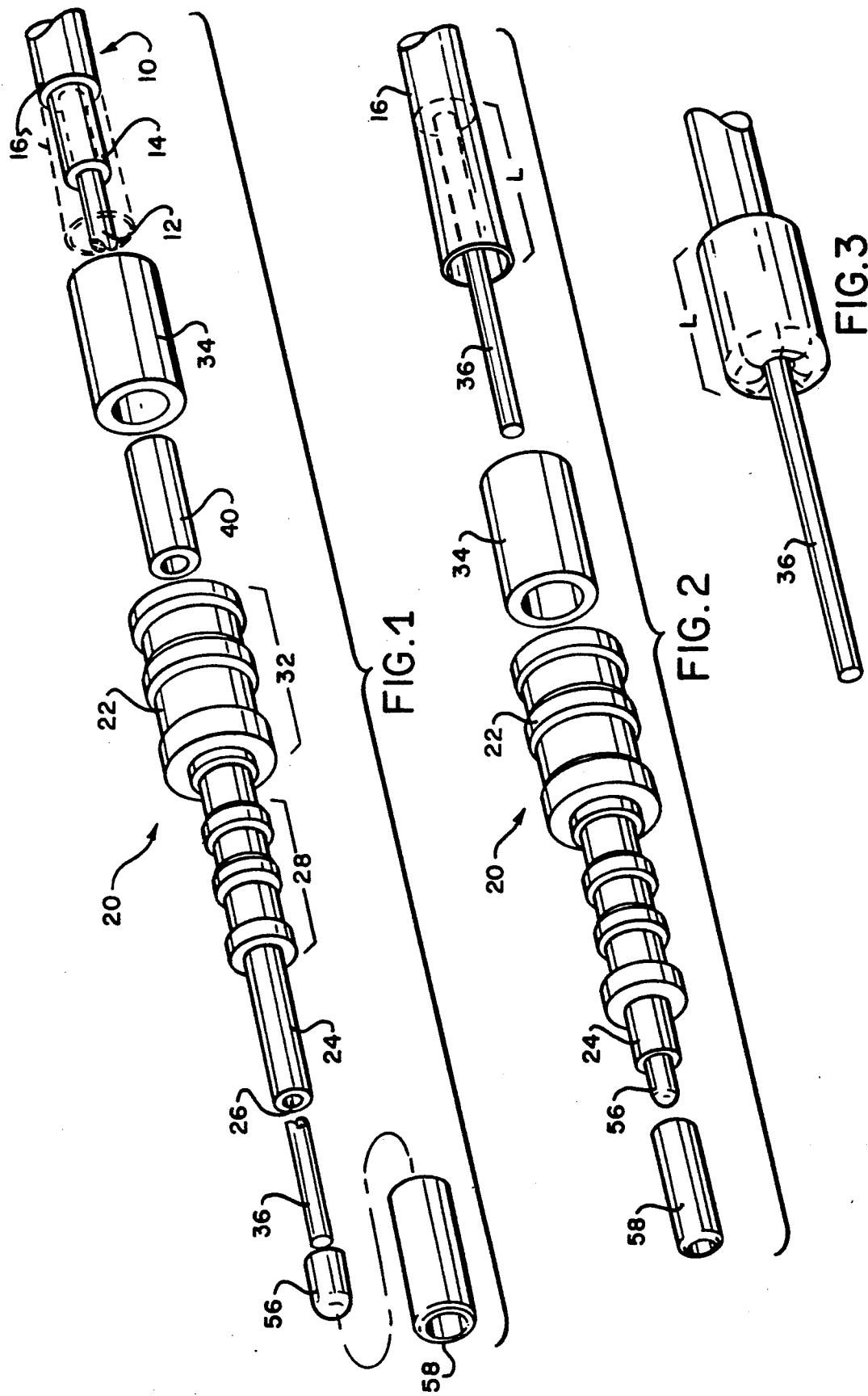

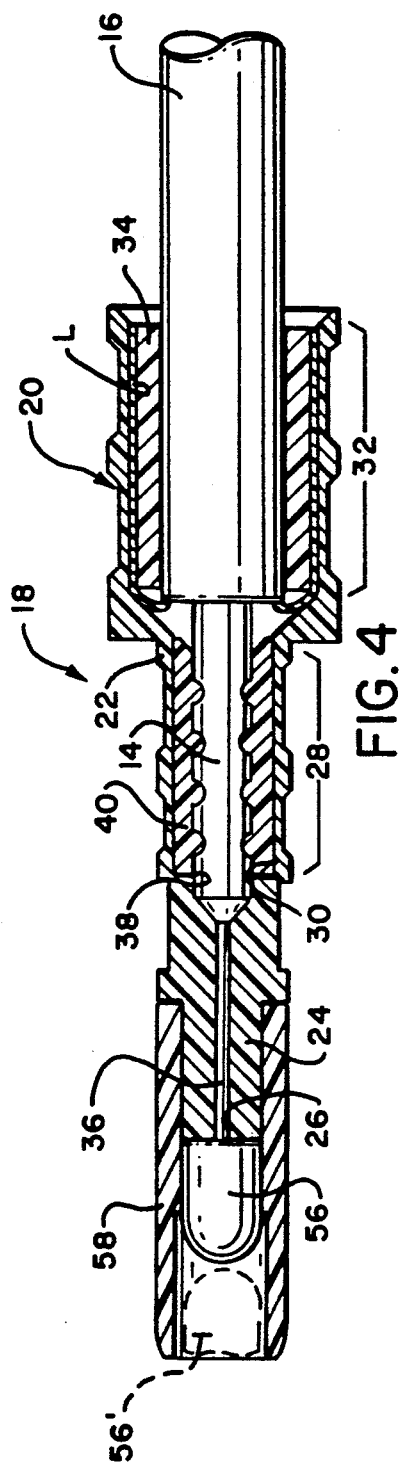
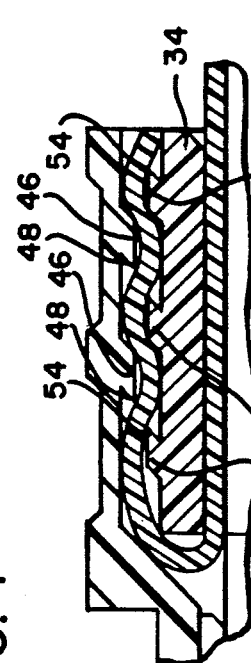
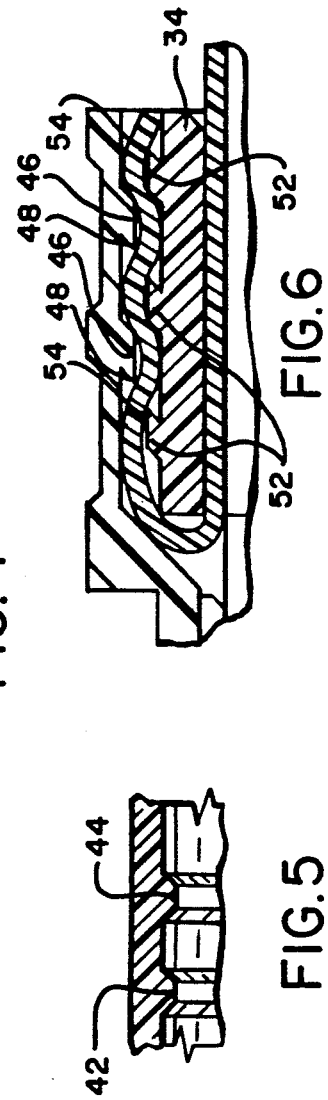
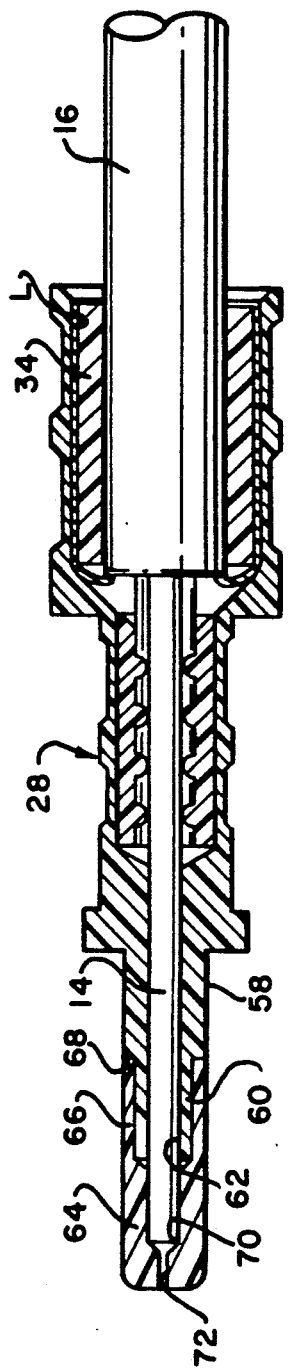

OPTICAL FIBER TERMINUS

BACKGROUND OF THE INVENTION

1. Field of the Invention

The present invention relates generally to establishing a junction for the two ends of glass fibers across which light signals can be efficiently transmitted, and, more particularly, to an optical fiber termination of simplified construction not requiring the use of adhesive materials for securing the fiber within the termination parts.

2. Description of Related Art

A frequent requirement in optical fiber equipment is to be able to interconnect two ends of a fiber that has been broken or the ends of two separate fibers, in such a way as to enable transmission of an optical signal along the fibers and across the junction. For an interconnection to be satisfactory, it must be able to transmit substantially the full optical signal not losing more than a few percent as the signal passes across the junction.

One effective optical fiber termination is disclosed in U.S. Pat. No. 4,483,584 to John Gresty assigned to the same assignee as the present application. The patented device has the ends of the two fibers to be interconnected faced off to form flat smooth surfaces precisely 90 degrees to the fiber longitudinal axis. Each of the fiber end portions are mounted within separate sets of three cylindrical pins holding the fiber within the interstices of the pins. The three pins with included fiber are, in turn, received within the opposite ends of a cylindrical alignment tube thereby effecting collimation of the fibers and locating the ends in a required slightly spaced, end facing relation. Such a connector, although highly effective, is complex and relatively expensive to manufacture as well as somewhat difficult to effect a fiber optic termination under field conditions.

U.S. Pat. No. 4,290,667, OPTICAL FIBER TERMINATIONS AND CONNECTIONS by Mark Chown discloses a termination technique in which each fiber has its end portion received within a capillary tube and with a faced-off fiber end located at the focal point of a lens. Two such fiber and lens devices are located at opposite ends of an alignment tube to complete the terminus. The patent also discloses other versions in which the optical fiber is clad within a ball lens, and in yet another form the fiber is located within a ferrule having a central recess for receiving a ball lens therein. An adhesive material such as an epoxy is used to match the end of the lens with the fiber.

In U.S. patent application No. 07/524,733, OPTICAL FIBER TERMINATION, by Alex Wasserman, assigned to the same assignee as the present application (now U.S. Pat. No. 5,097,524), a termination means is shown in which the bare glass end portion of an optical fiber is received in an opening within a ferrule end wall and secured therein by a first epoxy material. The outer face of the ferrule end wall is faced-off and substantially coterminus with the end of the fiber. An expanding lens is adhered to the outer surface of the ferrule end wall, and to the end of the faced-off fiber as well, by means of a second epoxy which has optical characteristics closely matching that of the glass portion of the fiber as well as the lens.

It is, therefore, a desideratum to provide an optical fiber termination that is reliable and of simplified construction. Also, since there are many environments in which epoxys cannot be used, or in which it is advisable not to use them, it is further desirable that termination be achieved without epoxy or other adhesive materials. For example, many epoxys require overnight curing which may not be feasible at all as well as being time consuming. On the other hand, so-called "fast curing" epoxys (e.g. 2-3 minutes) have been found to frequently crack the fiber.

SUMMARY OF THE INVENTION

The optical fiber termination of the present invention includes a ferrule having an end wall portion with a first opening of diameter closely matching the diameter of the glass core of the optical fiber. Immediately adjacent and aligned therewith in the ferrule is a second opening larger than the first opening and of a diameter enabling receipt of an optical fiber with its buffer tubing. A further or third opening adjacent the second opening and aligned with the first two openings has a diameter such as to enable receipt of the optical fiber with the protective jacket.

In preparation for assembly within the described termination device, an outer end portion of an optical fiber cable has a limited portion of the outside jacket removed in an even and uniform manner exposing the strain relief member which is usually made of Kevlar, or other suitable material. Next, a limited end portion of the fiber has the buffer tubing removed exposing the glass core. The exposed glass core is cleaved to an appropriate length and polished, if desired, to a selected configuration. A support sleeve which has an inner bore closely matching that of the outer diameter of the jacketed optical fiber is slid onto the cable and the strip of the strain relief portion is folded back over the sleeve. A resilient sleeve is then slid over the buffer tubing covered portion of the fiber which sleeve has an internal diameter closely matching that of the buffer tubing.

In final assembly, the described prepared optical fiber is then slid into the ferrule from the largest opening side locating the bare glass end within the ferrule first opening, the resilient sleeve surrounding the buffer tubing located within a third opening, and the support sleeve with the jacket and strain relief member of the optical fiber is located within a fourth opening. The final step is to crimp the ferrule wall surrounding the third and fourth openings so as to secure the strain relief about the support sleeve providing strain relief for the fiber and, as well, to clamp with moderate pressure the resilient sleeve about the buffer tubing. In this way, the bare fiber core is positively positioned within the first ferrule opening with the core outer end face being substantially coextensive with the outer end wall of the ferrule. The fiber core end face then may be polished depending on the type of terminus used to a precisely smooth finish and at 90 degrees to the fiber longitudinal axis.

A pair of such termination devices are received in opposite ends of an alignment tube such that when the devices abut together, the end faces of the fibers are collimated and held in a very slightly spaced relation for enabling efficient optical signal transmission across the junction.

DESCRIPTION OF THE DRAWING

In the accompanying drawing:

FIG. 1 shows an exploded view of the termination device of the present invention;

FIG. 2 is a further exploded view similar to FIG. 1 only partially assembled;

FIG. 3 is a perspective view of an optical fiber end portion showing the fiber outer jacket peeled back with the strain relief member for mounting in the invention;

FIG. 4 is a side elevational, sectional view of a lens type termination of this invention;

FIG. 5 is an enlarged sectional view through the terminus ferrule showing details;

FIG. 6 is an enlarged sectional view of the optical fiber cable strength retention member showing details thereof; and FIG. 7 is a sectional view, similar to FIG. 4, of a further embodiment of terminus for butt type termination.

DESCRIPTION OF A PREFERRED EMBODIMENT

With reference now to FIG. 1 of the drawing, an optical fiber cable 10 which will be terminated in a way to be described generally includes a glass or quartz core 12 enclosed within a synthetic plastic buffer tubing 14, all of which is contained within a protective cylindrical jacket 16. The glass core 12 is the portion of the fiber which transmits optical light signals and which can be easily broken or, if kinked or bent, can experience a substantial diminution of the light signal transmission efficiency.

The termination device of the present invention for the optical fiber 10 is enumerated as 18. The device includes a housing 20 having a generally tubular ferrule 22 with an elongated endwall portion 24 of a predetermined outer diameter and having an axial opening 26. The ferrule on moving away from portion 24 increases in cross-section at a central portion 28 to larger inside diameter than that of endwall 24 and a corresponding larger internal cavity 30 diameter. The opposite end of the ferrule has a still larger diameter end portion 32 with an internal bore diameter larger than that of the central portion 28. The internal bores of the portions 28 and 32 are aligned with one another, and in continuous communication with each other as well as with the axial opening 26 in the endwall portion 24.

For the ensuing description of the preliminary modification of an end portion of the optical fiber cable 10 for mounting in the termination device of the invention reference is simultaneously made to FIGS. 1, 3 and 4. As a first step, a cylindrical sleeve 34 having an internal opening permitting sliding receipt onto an optical fiber over its outer jacket is located on the fiber cable 10 at a point spaced substantially inwardly from the fiber end to be terminated. Then, an end portion, L, of the optical fiber jacket 16 is peeled back over the sleeve 34 (FIG. 3). In addition, a length of the buffer tubing 14 is removed from the outer end of the fiber leaving a bare glass end portion 36 of predetermined length and optically prepared (e.g., cleaved, polished). The length of the glass end portion is very closely identical to the length of the opening 26 such that when the end of the buffer tubing 14 is located against an internal shoulder 38 just outwardly of the inner end of the opening 26, the outer end of glass fiber is substantially coextensive with the outer face of the ferrule endwall portion 24. A further resilient sleeve 40 constructed of rubber or a synthetic plastic is generally cylindrical with a smooth exterior surface and a ribbed interior surface. The outer diameter of the sleeve enables substantially a sliding fit within the internal cavity of the central diameter portion 28 while the internal diameter of the sleeve 40 measured across the peaks of the various ribs is such as to provide a sliding but gripping contact with the fiber buffer tubing 14. The prepared optical fiber cable 10 is placed within the ferrule 22 as shown in FIG. 4 with the fiber bare glass end portion 36 being located in axial opening 26, the exposed tubing 14 and enclosing sleeve 40 within ferrule central portion cavity 30, and peeled-back protective jacket 16 or strain relief with underlying sleeve 34 in the largest diameter portion 32.

As can be seen best in FIG. 5, the interior wall of the ferrule central portion 28 includes at least two radially inwardly projecting annular ribs 42 and 44 having innermost diameters slightly less than the external dimensions of sleeve 40. By this construction when the fiber and sleeve are positioned within the ferrule central portion 28, the ribs force the resilient sleeve inwardly to aid in clamping engagement of the fiber buffer tubing both securing the fiber within the ferrule cavity as well as centrally positioning the fiber and, in that way, prevent microbending.

FIG. 6 depicts the details of the larger end of the ferrule 32 and sleeve 34. More particularly, internal walls of the ferrule larger diameter end include a plurality of ridges 46 having a relatively sharp outside edge 48 for frictionally engaging the fiber outer jacket or strain relief. Similarly, the sleeve 34 has a plurality of circumferentially extending ridges 52 each having a sharp edge 54 facing toward the ferrule open end when installed. In assembly, the peeled back fiber jacket or strain relief 16 is positioned over the sleeve as in the first described embodiment and wedged within the ferrule open end. The sharp edges 54 and 48 of the ridges 52 an 46, respectively, dig into opposite sides of the fiber jacket resisting movement of the fiber and enclosing sleeve in a direction that would remove it from the terminus.

Returning to FIG. 4 once more, a lens 56 is shown abutted against the outer end of the endwall portion 24 and an alignment tube 58 is slidingly received about the outer endwall portion and lens. For a complete optical fiber connector, another terminus is received on the end of a further fiber and slid into the open end of the alignment tube which is only represented by the dashed line depiction of a lens 56'.

FIG. 7 shows a still further embodiment of optical fiber terminus which does not utilize a lens. More particularly, the larger diameter end portion 34 and central portion 28 are identical to the first described embodiment. The smaller end portion 58 is generally cylindrical with a turned down outer end section 60 and an axial opening 62 of such dimensions as to enable the optical fiber buffer tubing 14 to pass therealong. A termination cap 64 is a cylindrical member having a first opening 66 at one end permitting sliding receipt onto end portion 60 that is positively positioned at shoulder 68. The cap includes a centrally located or second opening 70 of dimensions enabling receipt of the fiber buffer tubing and a third opening 72 of precise dimensions for receiving the glass core end. For a complete connection, a pair of termini terminated as just described are positioned within an alignment tube with their two cap ends arranged so that the faced-off fiber ends are very slightly spaced from one another and accurately aligned. One of the pair has a compensation feature to assure a close spacing between the optical fiber engaging end faces in order to assume precise optical integrity.

Optical fibers are typically provided with a protective jacket and in many cases a strain relief member constructed of Kevlar, for example. Where a strain relief member is present the clamping onto the sleeve 34 only involves the strain relief member. On the other hand, when no strain relief member is used the clamping action is solely onto the protective jacket.

Although the invention has been described in connection with a preferred embodiment, it is to be understood that those skilled in the appertaining arts may suggest modifications that will come within the spirit of the present invention and within the scope of the appended claims.

What is claimed is:

1. A termination for an optical fiber having a glass core, a buffer tubing over the glass core, and an outer protective jacket over the glass core and buffer tubing, comprising:
    a hollow crimpable ferrule having an entrance end of internal bore diameter larger than that of the glass fiber jacket, a central portion smaller than the entrance end bore diameter and larger than the glass fiber buffer tubing, and an endwall portion including an opening therethrough of cross-sectional dimension approximately identical to that of the fiber glass core;
    a first tubular sleeve for receipt over the glass fiber protective jacket; and
    a second sleeve of a resilient material for fitting receipt onto the buffer coating of the glass fiber with jacket removed;
    an end portion of the optical fiber having a first length of jacket peeled back over the first sleeve for receipt within the ferrule entrance end, a second lesser length of buffer tubing removed leaving a bare glass end portion for receipt within the ferrule endwall opening and a buffer tubing portion with jacket removed, received within the second sleeve, said ferrule being crimped into clamping relation about the first and second sleeves.

2. A termination for an optical fiber as in claim 1, in which the second sleeve has an internal wall surface formed into a plurality of transversely extending ribs.

3. A termination for an optical fiber as in claim 1, in which the first sleeve has an external wall surface formed into a plurality of ribs arranged generally transversely of the sleeve axis.

4. A termination for an optical fiber having a glass core, a buffer tubing over the glass core, and an outer protective jacket over the glass core and buffer tubing, comprising:
    a hollow ferrule having an entrance end of internal bore diameter larger than that of the glass fiber jacket, a central internal portion smaller than the entrance end bore diameter and larger than the glass fiber buffer tubing, and an endwall portion including an opening therethrough of cross-sectional dimension approximately identical to that of the fiber glass core;
    a first tubular sleeve for receipt over the glass fiber protective jacket; and
    a second sleeve of a resilient material for fitting receipt onto the buffer coating of the glass fiber with jacket removed, said second sleeve having an internal wall surface formed into a plurality of circumferentially extending ribs; and
    an end portion of the optical fiber having a first length of jacket peeled back over the first sleeve for receipt within the ferrule entrance end, a second lesser length of buffer tubing removed leaving a bare glass end portion for receipt within the ferrule endwall opening, and a buffer tubing portion with jacket removed received within the second sleeve.

5. A termination as in claim 4, in which the first tubular sleeve includes a plurality of circumferentially extending internal ribs having inwardly facing sharp edges for engaging the optical fiber jacket and resisting withdrawal of the fiber from the ferrule, and the outer surface of the first sleeve includes a plurality of ribs having sharp edges contacting the inner surface of the peeled-back jacket and resisting unpeeling of the jacket.

6. A terminus for an optical fiber cable having a bare core end portion, an adjacent buffer cladded portion with peeled back outer jacket, comprising:
    sleeve means clamped onto the optical fiber buffer cladded portion with the jacket peeled back over the said sleeve means;
    a ferrule having a continuous internal passageway with continuous straight-line axis, a first passageway portion of cross-sectional dimensions closely approximating those of the bare core, and adjacent passageway portion slightly undersize the fiber buffer cladded portion, and a next adjacent passageway portion of cross-sectional dimension providing a wedging fit of the optical fiber buffer cladded portion with the sleeve means and peeled back jacket thereover; and
    means wedged between the fiber buffer cladded portion outer surface and the internal surface of the ferrule adjacent passageway resisting removal of the fiber cable from the ferrule.

* * * * *